United States Patent
Tanaka

(10) Patent No.: US 9,058,309 B2
(45) Date of Patent: Jun. 16, 2015

(54) METHODS AND SYSTEMS FOR MULTIPLE STYLING HYPERTEXT MARKUP LANGUAGE (HTML) FORM FIELDS

(75) Inventor: Jamison M. Tanaka, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 275 days.

(21) Appl. No.: 12/979,962

(22) Filed: Dec. 28, 2010

(65) Prior Publication Data

US 2012/0072832 A1 Mar. 22, 2012

Related U.S. Application Data

(60) Provisional application No. 61/384,144, filed on Sep. 17, 2010.

(51) Int. Cl.
| | | |
|---|---|---|
| *G06F 17/00* | (2006.01) | |
| *G06F 17/21* | (2006.01) | |
| *G06F 17/24* | (2006.01) | |
| *G06F 3/0482* | (2013.01) | |
| *G06F 17/22* | (2006.01) | |
| *G06F 17/27* | (2006.01) | |
| *G06F 3/0481* | (2013.01) | |
| *G06F 3/023* | (2006.01) | |

(52) U.S. Cl.
CPC ............. *G06F 17/211* (2013.01); *G06F 17/24* (2013.01); *G06F 17/243* (2013.01); *G06F 3/0482* (2013.01); *G06F 17/22* (2013.01); *G06F 17/227* (2013.01); *G06F 17/276* (2013.01); *G06F 3/0481* (2013.01); *G06F 3/0237* (2013.01); *G06F 17/2264* (2013.01)

(58) Field of Classification Search
CPC . G06F 17/227; G06F 17/211; G06F 17/2247; G06F 17/22; G06F 17/24; G06F 17/2264; G06F 17/243; G06F 17/276; G06F 3/0237; G06F 3/0481; G06F 3/0482
USPC .................. 715/234–275, 221–225, 731, 780
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Quoc A Tran
(74) *Attorney, Agent, or Firm* — Blakely, Sokoloff, Taylor & Zafman

(57) ABSTRACT

Techniques to provide multiple styles in a single HTML text object. An input field to receive user-generated input is presented. User-generated input is received via the input field. The user-generated input based on formatting criteria. The formatting criteria provides N formatting types to be applied to the user-generated input, where N is at least two. An underlay field is provided for each of N−1 formatting types. One of the formatting types is applied to each of the N−1 underlay fields and the input field. The N−1 underlay fields are aligned with and the input field. Portions of the user-generated input are displayed within the corresponding fields while maintaining spacing of the user-generated input.

17 Claims, 4 Drawing Sheets

(56) References Cited

U.S. PATENT DOCUMENTS

| | | |
|---|---|---|
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,752,537 B2 * | 7/2010 | Beynon et al. ................ 715/222 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0144982 A1 * | 7/2003 | Reulein et al. .................... 707/1 |
| 2003/0151633 A1 | 8/2003 | George et al. |
| 2003/0159136 A1 | 8/2003 | Huang et al. |
| 2003/0187921 A1 | 10/2003 | Diec |
| 2003/0188260 A1 * | 10/2003 | Jensen et al. .................. 715/505 |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0094199 A1 * | 4/2007 | Deshpande et al. ............. 706/47 |
| 2010/0135412 A1 * | 6/2010 | Wang et al. ............. 375/240.16 |
| 2010/0251092 A1 * | 9/2010 | Sun ................ 715/222 |
| 2010/0251143 A1 * | 9/2010 | Thomas et al. ............... 715/760 |

* cited by examiner

METHODS AND SYSTEMS FOR MULTIPLE STYLING HYPERTEXT MARKUP LANGUAGE (HTML) FORM FIELDS

CLAIM OF PRIORITY

This application claims the benefit of U.S. Provisional Patent Application 61/384,144 entitled Methods and Systems For Styling Plain Text HTML Form Fields, by Jamison Tanaka, filed Sep. 17, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Various embodiments of the invention relate generally to techniques for formatting input fields in a graphical user interface. More specifically, embodiments of the invention relate to techniques for providing composite formatting and/or styling of HTML form fields.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many current web browsers support HyperText Markup Language (HTML) forms for inputting data. Most web browsers also allow for applying styles to entire form fields. Styles for the entire field can be changed dynamically using JavaScript or other techniques. For example, when creating a new account on a site or application, all the text typed into a "Name" field might be black Arial 10 point. Then, if the provided Name was invalid for some reason, the entered text could be changed to red Arial 10 point to help call attention to the issue. However, the current HTML specifications and browser-specific extensions do not allow for multiple concurrent values for style attributes within certain single form fields.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1:
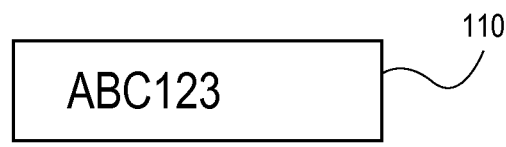
FIG. 1 is a diagram of an example a form field.

In the following description, numerous specific details are set forth. However, embodiments of the invention may be practiced without these specific details. In other instances, well-known circuits, structures and techniques have not been shown in detail in order not to obscure the understanding of this description.

In the description that follows, the following terms are used to describe various styling techniques and mechanisms. A "HTML form" is a form or field in a web page that allows a user to provide input. A "HTML form tag" sometimes abbreviated as "HTML form" is a programmatic element that wraps a form in a web page's source code and looks like "<form> . . . </form>". A "form input" or "form field" is anything a user can interact with on a page to insert data into a form.

A "form input tag" sometimes abbreviated as "form input" is a programmatic element that defines a single data field in a form, looks like "<input type=' . . . ' value=' . . . '/> and can be, for example:

type text: a single line text input field;
type password: an obfuscated single line text input field for entering a password or other text that should not be shown on the screen;
type radio: a single selection within a multiple choice list of radio buttons that can have any arbitrary value; and/or
type checkbox: a single checkbox that can be either checked or not.

A "form text area" can be a single or multiple line text field, or the label for a field or any piece of text on a form. A "form textarea tag" sometimes abbreviated as "form textarea" or written as "form text area tag" is a programmatic element that wraps a single multiline text data value in a HTML form and looks like "<textarea> . . . </textarea>".

When referring to a HTML form or field, "multiple styles" or "mixed styles" or even "composite styles" could be taken to mean many different things, for example:

some text styled with a given set of characteristics, while other text in the same field is styled differently;
applying styles in multiple ways (e.g., an attached style sheet, a style tag block, inline style attribute);
applying multiple style attributes to a single piece of text (e.g. color, font-family, size, weight, etc.); and/or
using Cascading Style Sheets (CSS) inheritance to cascade style rules to text.

One example may be: 1) all text on a page is defined as Arial; 2) all text in a form in the page is defined as black; 3) all text in input fields within the form is bold; and 4) all text in a certain input field is italicized. The net result of applying these rules would be italicized, bold, black, Arial text on the certain input field.

In one embodiment, conflicting rules can also be applied, and CSS has a built-in order of precedence to determine what takes effect. For example, 1) all text on a page is defined as black; 2) all text in a form in the page is defined as blue; 3) all text in input fields within the form is bold; and 4) all text in a certain input field is italicized. Blue overrides black because it is more specific, so the net result of applying these rules would be italicized, bold, blue, Arial text on the certain input field.

Described below are two example techniques that are detailed in this document that can be used to add styles within a form text area element (e.g., form field, text area), as opposed to styling the entire element. In one embodiment, this may be accomplished by superimposing a translucent field on top of an element that supports styles such as a DIV, or other, element where the styled content is allowed to show through.

In another embodiment, this may be accomplished by superimposing a translucent field on top of an identical element with an alternative style and in the underlying element only showing those characters that are stylized in the top layer, replacing other characters with a space or " " character. The non-space characters in the underlying layer show through. While many of the examples provided herein are directed to form fields, the techniques described herein may be applied to any markup language field or text area or other region in which only a single text style is natively supported.

FIG. 1 is a diagram of an example a form field. In the example of FIG. 1, field 110 is a single line text form field into which a user may provide alphanumeric input. Field 110 may be, for example, a field in a HTML page. A user may enter one or more alphanumeric characters (e.g., "ABC123").

It may be desirable to provide different formatting for different characters. For example, it may be desirable to display letters with a first text color (e.g., black) and to display numerals with a second text color (e.g., green).

Figure 2:
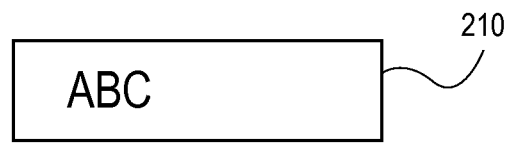
FIG. 2 is a diagram of a form field with an underlay to provide two formatting types.
Figure 2:
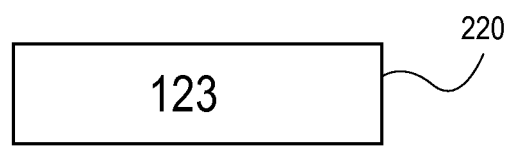

FIG. 2 is a diagram of a form field with an underlay to provide two formatting types. In the example of FIG. 2, letters are displayed with a first text color (e.g., black), 210, and to display numerals with a second text color (e.g., green), 220. Other formatting options can be similarly supported. For example, the letters may be displayed with a first text color and a first text size (e.g., 12 point black), while the numbers may be displayed with a second text color and second text size (e.g., 14 point green). Techniques for maintaining proper spacing are described in greater detail below.

In one embodiment, the page to be rendered is a HyperText Markup Language (HTML) page; however, other markup languages, for example, GML, XML, XHTML, may also be supported. HTML may utilize Cascading Style Sheets (CSS) to define formatting and layout characteristics. Current HTML standards support only a single format in each field of a page. That is, each character in a field must be displayed in the same font, size, color, etc. In a situation where it is desirable to draw attention to one or more characters, it would be helpful to provide those characters in a different format (e.g., different font, size and/or color). There may be other reasons for having multiple formats in a single field.

Most current web browsers support HTML forms for inputting data. Most also allow for applying styles to entire form fields. Styles can be changed dynamically using JavaScript or other techniques. For example, when creating a new account on a site or application, all the text typed into a "Name" field might be black Arial 10 pt. Then, if the provided Name was invalid for some reason, the entered text could be changed to red Arial 10 pt to help call attention to the issue.

For example, a text input field can accept multiple style values, in that it can accept one value for each of multiple attributes: color, background color, font-family, size, etc. However all text within the field is treated and styled identically—everything must be the same color, background color, font family, and size. The input field can also receive multiple values for a single attribute, but using the rules of CSS precedence those multiple values are distilled to a single eventual display value. For example, if all text on a page was styled as black, a form input field might be styled as red. Both the values 'black' and 'red' are parsed by the browser and considered for the input field, but only red is displayed to the user as it takes precedence—the entire field is red. It is not a mixture, combination, or blend, and every character is the same: red.

Figure 3:
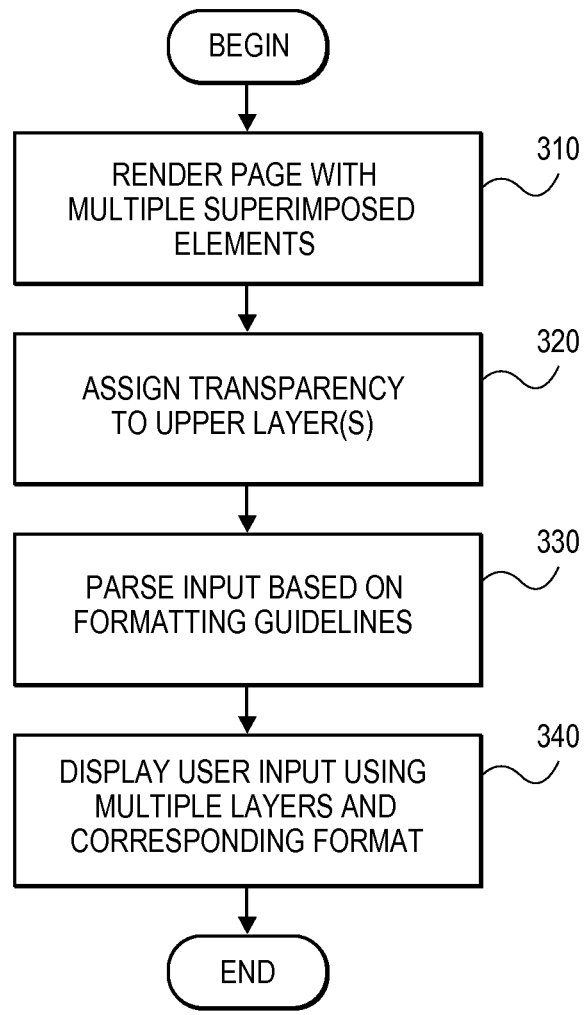
FIG. 3 is a flow diagram of one embodiment of a technique for providing multiple formats for a form field.

FIG. 3 is a flow diagram of one embodiment of a technique for providing multiple formats for a form field. The process of FIG. 3 may be provided by a web browser executing on a client computing platform that accesses content over a network. In one embodiment, the functionality described with respect to FIG. 3 may be triggered by instructions or other information contained within the code used to render the page to be displayed. Example code for form fields and for textareas is provided below in Appendix A.

In one embodiment, the page is rendered with two or more elements superimposed, 310. In one embodiment, CSS positioning is utilized to achieve the superimposing of multiple elements. In alternate embodiments, other techniques may be utilized. In one embodiment, the input field (i.e., the filed the user will type into) is placed on top (e.g., given a higher z-index than the other elements).

When the input field is a HTML form field, the multiple elements (i.e., fields) are aligned so that fields in higher layers overlay the fields in lower levels. When using protocols that support only a single format per field, a layer (and corresponding field). Each layer is assigned a format corresponding to the desired format for selected characters to be displayed therein. The multiple elements are shown at the same size using CSS height and width, padding, margins, and borders, line heights, font sizes, etc.

In one embodiment, each layer (and therefore each corresponding field) has a formatting criteria that describes the format of the characters to be displayed in the field. The formatting criteria can be any combination of formatting characteristics (e.g., font type, font size, font color, character features) supported by the markup language, browser, etc.

The upper layers are assigned a transparency, 320. The transparency of the upper layers allows the lower layers to be seen by the user. By aligning the various elements and causing the upper layers to have some transparency, the resulting user experience can be as if the single input field supported multiple types of formatting.

In one embodiment, the top field(s) is/are assigned an alpha transparency value to allow the underlying element to show through. Generally, 10-50% alpha is acceptable; however, other alpha values may also be used. Less than 10-50% and the selection and cursor elements may be hard to distinguish. More than 10-50% and the underlying styles may not bleed through enough to be easily visible. In one embodiment, the top level is given a neutral color for text—gray, light gray, or black—to ensure the bottom layer can be easily distinguished.

The browser parses input received from the user according to the formatting guidelines, 330. As a simple example, if alphanumeric characters have a first set of formatting characteristics and numerals have a second set of formatting characteristics, the browser may assign the alphanumeric characters to the layer providing the first set of formatting characteristics and the numerals to the layer providing the second set of formatting characteristics.

In one embodiment, as the user enters content, a script in the page written in, for example, JavaScript keeps the content in the underlying styled element the same as in the top plain text element, but with the desired styles inserted and applied using, for example, SPAN tags or other common methods.

This could happen on a specified interval, or via event watching (keystroke, paste, click, etc.). Other parsing mechanisms may also be supported.

The browser displays the user-generated input using the multiple layers with corresponding formats, 340. The user sees a mixture of their content and the underlying content that shows through, giving the illusion of styled text field content.

Because DIV elements support styling at a fine level of granularity—individual paragraphs, sentences, words, or even single characters—it is an effective presentation vehicle in a web application or web page. However, when accepting user input, the standard method is to use an HTML form, made up of INPUT, TEXTAREA, SELECT, and OPTION fields within a set of containing FORM tags. These individual fields can be styled only as a whole—all the content within one field must use the same style (color, font, size, weight, etc.). By placing a styled DIV underneath a partially transparent form field, and keeping the text in both identical, the user is able to type in the form field but see both layers superimposed, giving the appearance of whatever styles the application or site desires.

Words might be styled differently for a variety of reasons. Formatting differences may be used to indicate a match to a database record such as a username or object identifier, or to indicate an error condition, such as an invalid character, and/or or to indicate the value is too long to be accepted, the portion of the value that does not fit could be marked through or grayed out to indicate the content cutoff point, etc. Formatting difference may also be used to indicate a keyword or key character functionality (e.g., adding a metatag to a comment post on a news feed by preceding the keyword with "#"), giving the marked word extra weight, listing in a directory of keywords, or higher rankings in search results, etc. As another example, if an existing saved value is being modified, the new changes could be marked in a separate style.

Because some browsers determine line break positioning for long lines differently in DIVs and TEXTAREAs, care should be taken to ensure expected data maintains synchronicity between the layers, especially at certain zoom levels or with smaller fonts. This can generally be done by selectively applying CSS padding to the right edge of one or the other layer.

Alternatively, overlapped TEXTAREA elements may be utilized instead of a DIV under a TEXTAREA. Although the underlying TEXTAREA can only have a single style, it can be different than the topmost TEXTAREA. By making the top one partially transparent and the bottom one contain only the differently styled characters, with everything else replaced by white space or masked underscore characters, the effect is similar to the DIV-based technique—users can be shown multiple colors within a single field. While it does not allow the same degree of style flexibility as the DIV based technique, it does guarantee that both layers will have synchronized line breaks at any zoom level or in any browser.

Figure 4:
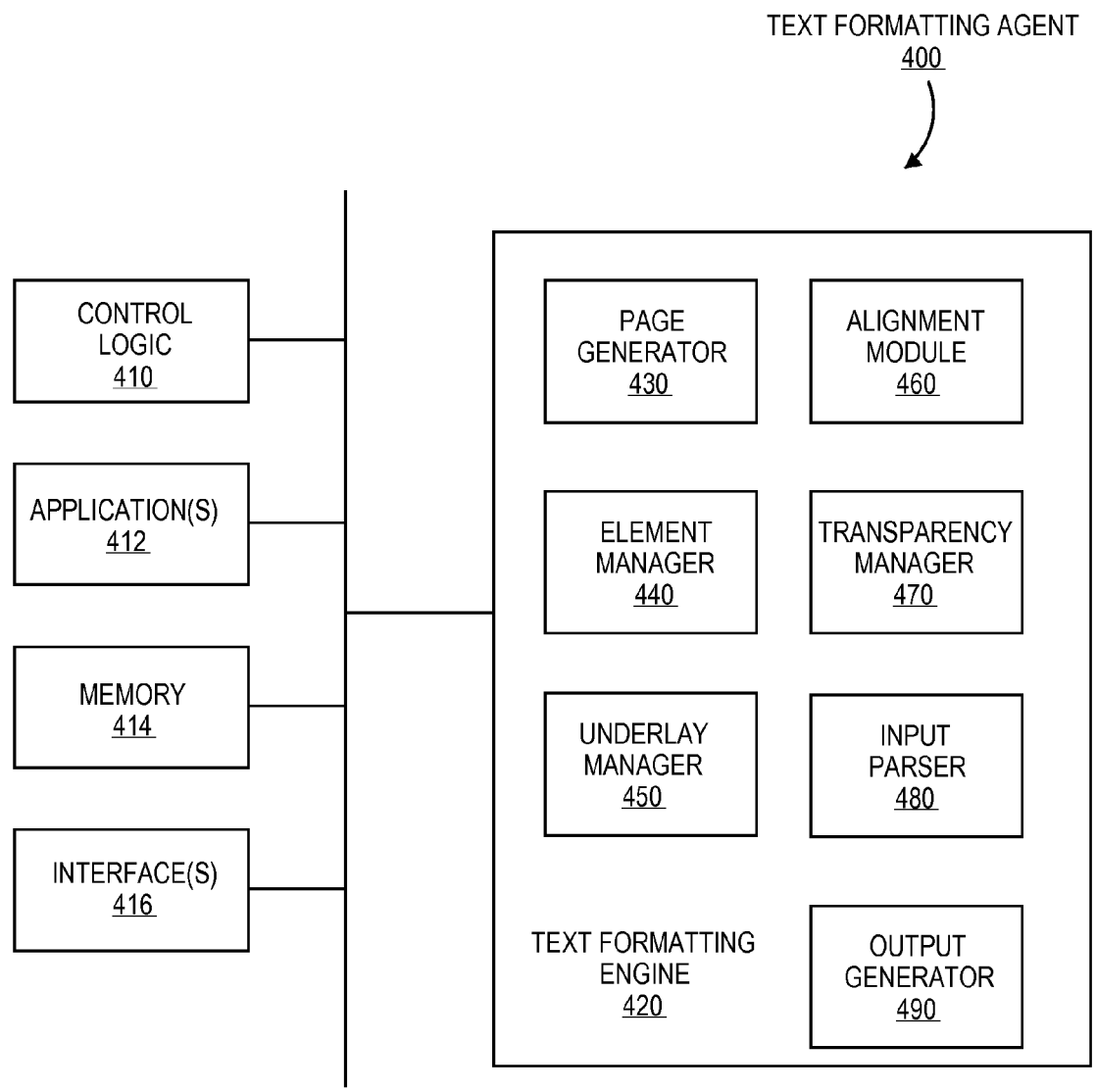
FIG. 4 is a block diagram of one embodiment of an agent that may provide text editing functionality as described herein.

FIG. 4 is a block diagram of one embodiment of an agent that may provide text editing functionality as described herein. Text formatting agent 400 may be a part of a browser running on a computing platform (e.g., the computing system of FIG. 5), or text formatting agent 400 may be part of a host operating system, and/or other components of a computing platform.

Text formatting agent 400 includes control logic 410, which implements logical functional control to direct operation of text formatting agent 400, and/or hardware associated with directing operation of text formatting agent 400. Logic may be hardware logic circuits and/or software routines. In one embodiment, text formatting agent 400 includes one or more applications 412, which represent code sequence and/or programs that provide instructions to control logic 410.

Text formatting agent 400 includes memory 414, which represents a memory device and/or access to a memory resource for storing data and/or instructions. Memory 414 may include memory local to text formatting agent 400, as well as, or alternatively, including memory of the host system on which text formatting agent 400 resides. Text formatting agent 400 also includes one or more interfaces 416, which represent access interfaces to/from (an input/output interface) text formatting agent 400 with regard to entities (electronic or human) external to text formatting agent 400.

Text formatting agent 400 also includes text formatting engine 420, which represents one or more functions or module that enable text formatting agent 400 to provide the indexing services as described above. The example of FIG. 4 provides several modules that may be included in text formatting engine 420; however, different and/or additional modules may also be included. Example modules that may be involved in providing the text formatting functionality include page generator 430, element manager 440, underlay manager 450, alignment module 460, transparency manager 470, input parser 480 and output generator 490. Each of these modules may further include other sub-modules to provide other functions. As used herein, a module refers to routine, a subsystem, logic circuit, microcode, etc., whether implemented in hardware, software, firmware or some combination thereof.

Page generator 430 operates to render the page to be displayed within a browser (or other application) of the host system. Page generator 430 operates on the encoded data of the page, for example, HTML code, or XML code. Element manager 440 operates to manage elements within the page including form fields, textareas and other element that may be used to provide multilevel formatting as described herein. Element manager 440 may manage the size and positioning of the element within the page to be displayed.

Underlay manger 450 operates to manage the one or more layers that underlie the input element to be formatted as described herein. For example, underlay manager 450 may control the size and or positioning of the underlying layers as well as assigning formatting characteristics to the one or more layers.

Alignment module 460 operates to ensure that the elements on the various layers are aligned as well as ensuring the characters within the elements are aligned. Similarly, transparency manager 470 operates to provide proper transparency/opacity to various layers and elements to allow a user to see all of the characters with the proper formatting.

In the following examples, the text string "This is a #tag of @Joe" is the user-generated input provided. The formatting to be applied is that the word following "#" is in blue and the word following "@" is in red. In the first example, spaces are utilized in the lower layers to maintain proper spacing, and in the second example, underscore characters are utilized to maintain proper spacing.

Example 1

| This | is | a | #tag | of | @Joe | translucent gray |
|------|----|----|------|----|------|------------------|
|      |    |    |      |    |      | transparent/clear |
|      |    |    | #tag |    |      | opaque blue |
|      |    |    |      |    | @Joe | opaque red |

Example 2

| This | is | a | #tag | of | @Joe | translucent gray |
|---|---|---|---|---|---|---|
| — | — | — | — | — | — | opaque white |
| — | — | — | #tag | — | — | opaque blue |
| — | — | — | — | — | @Joe | opaque Red |

Input parser 480 operates to parse the user-generated input and assign the various characters to the appropriate layers and elements so that the other component may provide the desired formatting. Output generator 490 operates to combine the elements provided by the components of text formatting engine 420 to provide an output page that includes the desired formatting of the user-generated input.

Figure 5:
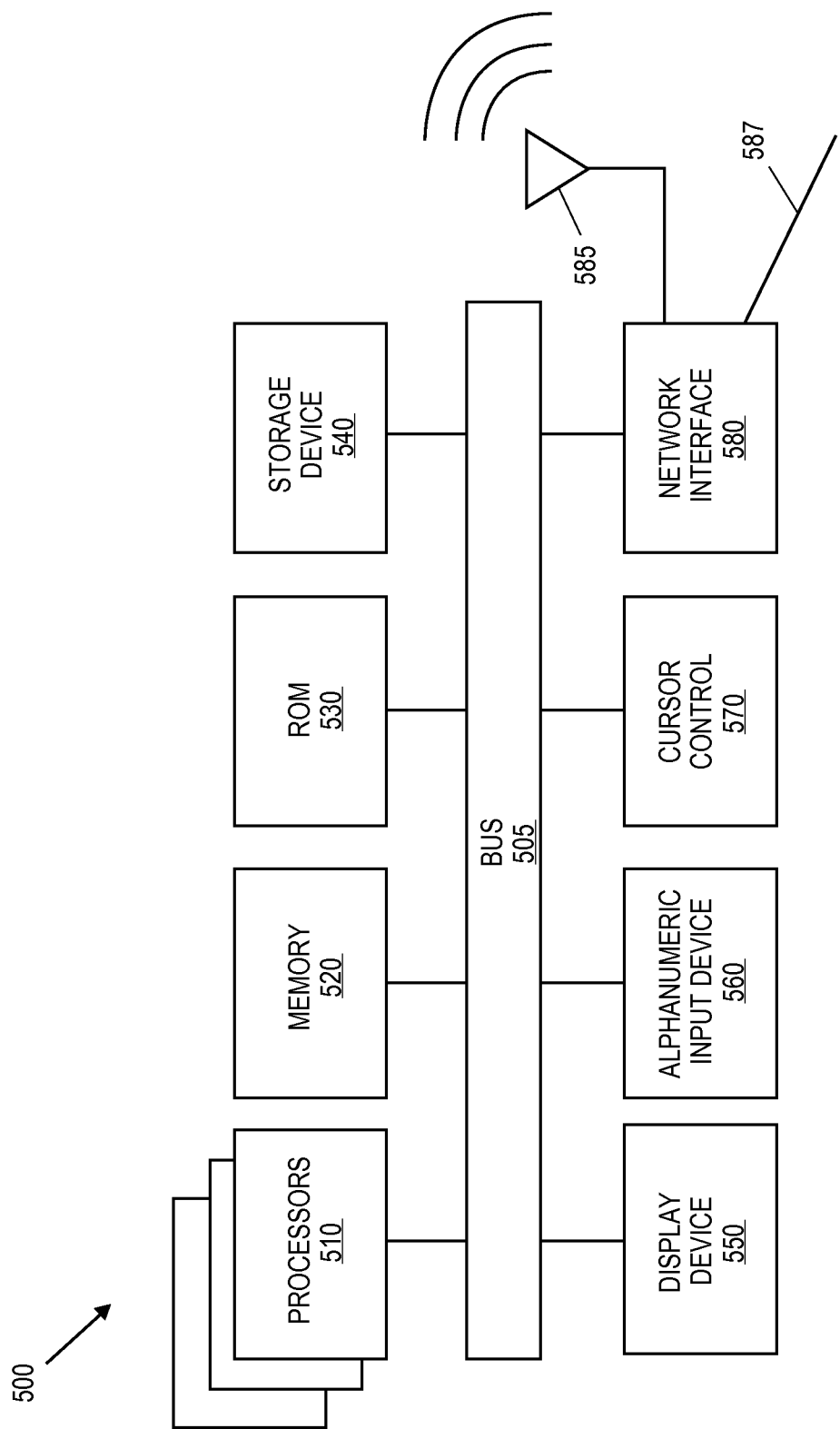
FIG. 5 is a block diagram of one embodiment of an electronic system.

FIG. 5 is a block diagram of one embodiment of an electronic system. The electronic system illustrated in FIG. 5 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 500 includes bus 505 or other communication device to communicate information, and processor 510 coupled to bus 505 that may process information. While electronic system 500 is illustrated with a single processor, electronic system 500 may include multiple processors and/or co-processors. Electronic system 500 further may include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Electronic system 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled to electronic system 500.

Electronic system 500 may also be coupled via bus 505 to display device 550, such as a cathode ray tube (CRT) or liquid crystal display (LCD), to display information to a user. Alphanumeric input device 560, including alphanumeric and other keys, may be coupled to bus 505 to communicate information and command selections to processor 510. Another type of user input device is cursor control 570, such as a mouse, a trackball, or cursor direction keys to communicate direction information and command selections to processor 510 and to control cursor movement on display 550.

Electronic system 500 further may include network interface(s) 580 to provide access to a network, such as a local area network. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

In one embodiment, network interface(s) 580 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to the examples discussed above, the browser (or other application) may capture keystrokes and mimic an input field or textarea. Because this may require significant work and overhead for simple operations, this may be more appropriate for a web based word processor or other more complex text processing. Also, an independent rich text editor may be utilized to capture the user-generated input.

In one embodiment, content may be captured in a field offscreen (or in a hidden or obscured field) and then copied using, for example, JavaScript, to a styled container such as a DIV. In another embodiment, a contentEditable DIV may be utilized. However, this may introduce security risks, especially around handling inserted, pasted, or dropped JavaScript.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   presenting, via a graphical user interface, a plurality of fields including at least an input field to receive user-generated input, wherein the protocol to present the plurality of fields supports only a single format for the input field;
   receiving the user-generated input with a computing platform providing the graphical user interface via the input field;
   parsing the user-generated input based on formatting criteria, wherein the formatting criteria comprises N text formatting types to be applied to the user-generated input, wherein N is at least two;
   providing an underlay field for each of N−1 text formatting types;
   applying one of the text formatting types to each of the N−1 underlay fields and the input field;
   aligning the N−1 underlay fields and the input field, wherein in aligning comprises at least providing proper spacing between text characters and by superimposing a translucent field on top of a corresponding element with a text formatting type and in the one or more underlay fields only showing characters that are stylized in higher layers, replacing other characters with a space so non-space characters in the one or more underlay fields show through;

displaying portions of the user-generated input within the corresponding fields while maintaining spacing of the user-generated input.

2. The method of claim 1 wherein the protocol comprises a HyperText Markup Language (HTML)-compliant protocol.

3. The method of claim 2 wherein Cascading Style Sheets (CSS) are utilized to define formatting of at least the input field.

4. The method of claim 2 wherein the input field comprises a form field.

5. The method of claim 2 wherein the input field comprises a text area.

6. The method of claim 1 wherein maintaining spacing of the user-generated input comprises, for each of the fields, replacing a character to be displayed in a different field with a space.

7. The method of claim 1 wherein maintaining spacing of the user-generated input comprises, for each of the fields, replacing a character to be displayed in a different field with an underscore character.

8. A non-transitory data storage device having stored thereon instructions that, when executed by one or more processors, cause the one or more processors to:

present, via a graphical user interface, a plurality of fields including at least an input field to receive user-generated input, wherein the protocol to present the plurality of fields supports only a single format for the input field;

receive the user-generated input with a computing platform providing the graphical user interface via the input field;

parse the user-generated input based on formatting criteria, wherein the formatting criteria comprises N text formatting types to be applied to the user-generated input, wherein N is at least two;

provide an underlay field for each of N−1 text formatting types;

apply one of the text formatting types to each of the N−1 underlay fields and the input field;

aligning the N−1 underlay fields and the input field, wherein in aligning comprises at least providing proper spacing between text characters and by superimposing a translucent field on top of a corresponding element with a text formatting type and in the one or more underlay fields only showing characters that are stylized in higher layers, replacing other characters with a space so non-space characters in the one or more underlay fields show through;

display portions of the user-generated input within the corresponding fields while maintaining spacing of the user-generated input.

9. The data storage device of claim 8 wherein the protocol comprises a HyperText Markup Language (HTML)-compliant protocol.

10. The data storage device of claim 9 wherein Cascading Style Sheets (CSS) are utilized to define formatting of at least the input field.

11. The data storage device of claim 9 wherein the input field comprises a form field.

12. The data storage device of claim 9 wherein the input field comprises a text area.

13. The data storage device of claim 8 wherein the instructions that cause the one or more processors to maintain spacing of the user-generated input comprise instructions that cause the one or more processors to, for each of the fields, replace a character to be displayed in a different field with a space.

14. The data storage device of claim 8 wherein the instructions that cause the one or more processors to maintain spacing of the user-generated input comprise instructions that cause the one or more processors to, for each of the fields, replace a character to be displayed in an underscore character.

15. A system comprising:
a bus;
an output device coupled with the bus;
a memory coupled with the bus;
a processor coupled with the bus to communicate with the memory and with the output device, the processor to execute instructions stored in the memory to provide a graphical user interface on the output device, the processor to present, via a graphical user interface, a plurality of fields including at least an input field to receive user-generated input, wherein the protocol to present the plurality of fields supports only a single format for the input field, to receive the user-generated input via the input field, to parse the user-generated input based on formatting criteria, wherein the formatting criteria comprises N text formatting types to be applied to the user-generated input, wherein N is at least two, to provide an underlay field for each of N−1 text formatting types, to apply one of the text formatting types to each of the N−1 underlay fields and the input field, to align the N−1 underlay fields and the input field, wherein in aligning comprises at least providing proper spacing between text characters and by superimposing a translucent field on top of a corresponding element with a text formatting type and in the one or more underlay fields only showing characters that are stylized in higher layers, replacing other characters with a space so non-space characters in the one or more underlay fields show through, and to display portions of the user-generated input within the corresponding fields while maintaining spacing of the user-generated input.

16. The system of claim 15 wherein the input field comprises a form field.

17. The system of claim 15 wherein the input field comprises a text area.

* * * * *